3,658,855
Patented Apr. 25, 1972

3,658,855
ESTRADIOL 3-PROPARGYL ETHER 17-TRICHLOROACETATE

Gunther Kruger, St. Laurent, Quebec, and Robert G. Burford, Dollard des Ormeaux, Quebec, Canada, assignors to Bio-Research Laboratories Ltd., Pointe Claire, Quebec, Canada
No Drawing. Filed Dec. 2, 1969, Ser. No. 881,603
Claims priority, application Canada, Nov. 5, 1969, 66,776
Int. Cl. C07c *169/08*
U.S. Cl. 260—397.5        11 Claims

ABSTRACT OF THE DISCLOSURE

There is disclosed the new compound estradiol 3-propargyl ether 17-trichloroacetate useful as a finishing agent in the poultry industry and possessing high subcutaneous estrogenic activity coupled with very low oral estrogenic activity. The novel compound may be produced from estradiol via the intermediate estradiol 3-propargyl ether.

---

The present invention relates to estradiol 3-propargyl ether 17-trichloroacetate, to processes for its synthesis, and to its utility as a finishing agent in the poultry industry.

The novel estradiol 3-propargyl ether 17-trichloroacetate of the invention has the formula:

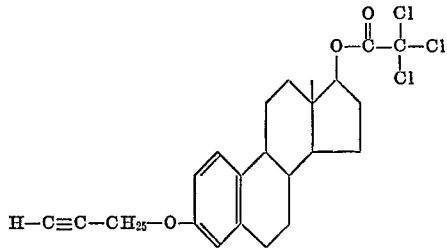

The new estradiol 3-propargyl ether 17-trichloroacetate possesses the interesting and unexpected property of showing strong estrogenic activity of long duration when subcutaneously administered, while showing no estrogenic activity when orally administered. By this segragation of activity the new estradiol 3-propargyl ether 17-chloroacetate thus differs greatly from other active estradiol derivatives. The subcutaneous and oral activities of estradiol 3-propargyl ether 17-trichloroacetate are depicted in the following Table I and are contrasted with estradiol 3-benzoate, which is commonly used as a standard reference substance in estrogenic tests, and with estradiol 17-palmitate, which is at present favoured as a finishing agent in the poultry industry. In the table the estrogenic activity of these compounds is assessed by their uterotrophic activity and their activity in the Allen-Doisy test.

As can be seen from the table, the estradiol 3-propargyl ether 17-trichloroacetate compares very favourably with the two latter compounds as regards the duration and intensity of estrogenic effects after subcutaneous administration. With regard to oral administration, estradiol 3-benzoate and 17-palmitate show considerable estrogenic activity while estradiol 3-propargyl ether 17-trichloroacetate was found to be void of such oral activity.

These properties make the estradiol 3-propargyl ether 17-trichloroacetate highly suitable as a finishing agent in the poultry industry. Estrogens have, in the past, been used as finishing agents for meat-type chickens. Injected subcutaneously into birds of either sex, the estrogenic material is responsible for relative improvements in skin smoothness and appearance, and tenderness and juiciness of meat. Fat tends to be distributed more evenly throughout the muscled portions of the body and, in the case of some compounds, the amount of waste deposit fat in the abdominal cavity is substantially reduced. In the male bird, treatment with estrogen prevents development of testes, combs and wattles and this feminizing effect tends to produce a quieter, less aggressive bird. Because of this sex-neutralizing effect in male birds, an effect which is closely comparable to that of castration (caponization), estrogenic compounds used in this fashion have been referred to as "caponizing" agents. Many estrogens that have been used as poultry finishing agents possess a substantial degree of oral activity. This is an undesirable attribute since it has been established that residues of these compounds remain in the edible tissues and offal of treated poultry. In consequence, the use of these earlier material has created a hazard for both human and animal consumers of poultry products, this hazard being related to physiologically active estrogenic residues in treated poultry at the time of slaughter.

The compound of this invention may be injected subcutaneously into a suitable body part of the chicken, for example, the head or neck, by mechanical devices used at present for the injection of estrogenic finishing agents. They may be injected in the form of a pellet or as a suitable suspension of emulsion in an oil; it being understood that any conventional carrier well known to those skilled in the art may be employed.

According to a further aspect of the present invention, there is provided a process for preparing the novel compound, which process may be illustrated as follows:

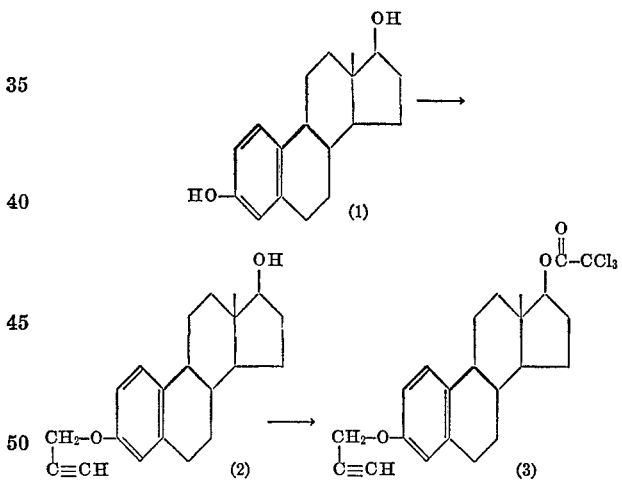

In accordance with the above process, the estradiol 3-propargyl ether 17-trichloroacetate (3) is prepared by treating estradiol (1) with propargyl bromide and a base in the presence of dimethylsulfoxide to yield estradiol 3-propargyl ether (2). The intermediate is then converted to the desired product (3) with trichloroacetyl chloride in the presence of a base.

As bases in the first step of the process, in which estradiol (1) is converted to its 3-propargyl ether (2), organic and inorganic bases such as primary, secondary or tertiary alkylamines, alkali metal hydroxides or alkoxides, or, preferably, an alkali metal carbonate may be used. Working up in the conventional way by dilution and extraction with an organic solvent then yields estradiol 3-propargyl ether on evaporation, which is sufficiently pure to permit its conversion to an estradiol 3-propargyl ether 17-trichloroacetate in high yield in the subsequent step.

The first step is preferably carried out at a temperature ranging from about 18° C. to about 100° C., desirably at room temperature, for a period of time ranging from one minute to five hours.

The above described step of converting estradiol to estradiol 3-propargyl ether is a novel feature of the present invention, having the advantage that the 3-hydroxy group of the estradiol can be selectively converted into the 3-propargyl ether without concomitant conversion of the 17-hydroxy group into the corresponding 17-propargyl ether. It is a further special advantage that by the above method estradiol can very conveniently and practically quantitatively be converted to the above propargyl ether at room temperature in less than one hour and that no additional amounts of propargyl bromide and alkali carbonate have to be added during the reaction. In a previous method of converting the 3-hydroxy group of 15-estrone, the 17-dehydroanaloxy of estradiol, to the 3-propargyl ether methanol instead of dimethylsulfoxide was used as the solvent and sodium hydroxide as the base. This method is considerably more cumbersome and requires prolonged refluxing for more than two days and frequent addition of propargyl bromide and sodium hydroxide, cf. G. C. Buzby et al., J. Med. Chem., vol. 7, p. 755, 1964.

Trichloroacetylation of the estradiol 3-propargyl ether, obtained as outlined above, by conventional methods such as treatment with a trichloroacetyl chloride in the presence of a base, preferably a tertiary amine, such as triethylamine or pyridine, yields the corresponding estradiol 3-propargyl ether 17-trichloroacetate.

Having thus generally described the invention, reference will now be made to the accompanying examples illustrating preferred embodiments.

EXAMPLE I

A mixture of 1.5 g. of estradiol, 7.5 ml. of dimethylsulfoxide and 300 mg. of sodium methoxide (1 equivalent) was warmed to 50° in an atmosphere of nitrogen till most of the suspended, solid material had dissolved. The mixture was cooled to room temperature and 1.0 ml. of propargyl bromide was added. The mixture was agitated for 30 minutes and then poured into 100 ml. of water. Extraction with ether, extraction of the ethereal phase with water, drying and subsequent addition of petroleum ether gave a precipitate consisting of 400 mg. of unreacted estradiol, which was filtered off. The filtrate, which contained estradiol 3-propargyl ether as practically the only steroid, as indicated by tlc, was concentrated at reduced pressure. A mixture of the residue obtained, 6.0 ml. of pyridine and 1.0 ml. of trichloroacetyl chloride was left to stand for 10 minutes at room temperature in an atmosphere of nitrogen, whereupon 80 ml. of 0.5 N hydrochloric acid was added. The aqueous mixture was extracted with petroleum ether-methylene chloride 10:1, the organic phase was extracted several times with water and concentrated at reduced pressure to a thick oil. Methanol was added and the resulting precipitate was filtered off yielding 1.04 g. of estradiol 3-propargyl ether 17-trichloroacetate. Recrystallization from petroleum ether-ether afforded a sample, M.P. 90–91°

$\gamma_{max.}^{Nujol}$ 3320, 1768, 1618 and 1580 cm.$^{-1}$

EXAMPLE II

A mixture of 0.5 gram of estradiol, 1.0 gram of anhydrous potassium carbonate, 5.0 ml. of dimethylsulfoxide and 0.66 ml. of propargyl bromide was stirred in an atmosphere of nitrogen for 1 hour at room temperature. The mixture was then poured into 100 ml. of 2 N hydrochloric acid, and then extracted with ether. The ether extract was extensively extracted with water, and evaporated to give a material containing estradiol 3-propargyl ether as practically the only steroid. Treatment of this product with trichloroacetyl chloride and pyridine according to the procedures of Example I gave, after evaporation of the ethereal phase, digestion of the residue obtained with methanol, and subsequent filtration, 0.516 gram of estradiol 3-propargyl ether 17-trichloroacetate, having a melting point of 88–90° C.

EXAMPLE III

The following example summarizes the results of biological test employing the compound of the present invention—estradiol 3-propargyl ether 17-trichloroacetate (hereinafter referred to as A); compared to the compounds estradiol 3-benzoate (hereinafter referred to as B); and estradiol 17-palmitate (hereinafter referred to as C).

In the following test, the above three compounds were tested, on different animal species in varying dosage amounts, and the results are shown in following Table I.

TABLE I.—BIOLOGICAL TESTS ON ESTRADIOL 3-PROPARGYL ETHER 17-TRICHLOROACETATE (A), ESTRADIOL 3-BENZOATE (B) AND ESTRADIOL 17-PALMITATE (C)

| Compound | Biological test | Animal species | Route | Dose in mg./ animal | Result |
|---|---|---|---|---|---|
| (A) | Allen-Doisy* | Rat | Subcutaneous | 500 | 100 (48 hours), 70 (14 days). |
| (A) | do | Rat | Oral | 500 | 0 (24 hours). |
| (A) | Uterotrophic ▾ | Mouse | Subcutaneous | 0.5 | 3 (24 hours), 3 (28 days), 1 56 days). |
| (A) | do | do | do | 5.0 | 5 (24 hours), 4 (28 days), 1 (56 days). |
| (A) | do | do | Oral | 32.5 | 1 (24 hours), 1 (7 days), 1 (14 days). |
| (A) | do | do | do | 325 | 1 (24 hours), 1 (7 days), 1 (14 days). |
| (B) | Allen-Doisy | Rat | Subcutaneous | 381 | 100 (24 hours), 100 (7 days), 14 (28 days). |
| (B) | do | Rat | Oral | 500 | 40 (24 hours), 20 (4 days), 10 (7 days). |
| (B) | Uterotrophic | Mouse | Subcutaneous | 0.05 | 4 (24 hours), 3 (14 days), 1 (56 days). |
| (B) | do | do | do | 0.5 | 3 (24 hours), 6 (14 days), 1 (66 days). |
| (B) | do | do | Oral | 5.0 | 2 (24 hours), 1 (14 days). |
| (B) | do | do | do | 50.0 | 1 (24 hours), 5 (7 days), 2 (28 days). |
| (B) | do | do | do | 500 | 1 (24 hours), 8 (7 days), 5 (28 days). |
| (C) | Allen-Doisy | Rat | Subcutaneous | 500 | 100 (24 hours,) 100 (7 days), 60 (28 days). |
| (C) | do | Rat | Oral | 500 | 30 (24 hours), 20 (48 hours), 10 (7 days). |
| (C) | Uterotrophic | Mouse | Subcutaneous | 0.5 | 1 (24 hours), 1 (14 days), 4 (28 days). |
| (C) | do | do | do | 5.0 | 5 (24 hours), 4 (28 days), 1 (56 days). |
| (C) | do | do | Oral | 5.0 | 1 (24 hours), 1 (7 days), 1 (14 days). |
| (C) | do | do | do | 50.0 | 1 (24 hours), 3 (7 days), 1 (14 days). |
| (C) | do | do | do | 500.0 | 1 (24 hours), 5 (7 days), 3 (14 days). |

*The Allen-Doisy test referred to in the Journal of American Medical Association, 81, page 819, 1923.
▾ The uterotrophic test was according to B. L. Rubin et al., Endocrinol, vol. 49, page 429, 1951.

In Table I, the numbers in brackets under the heading "Result" refer to the time elapsed between administration and testing. In the Allen-Doisy test, the numbers preceding the brackets refer to the percentage of animals showing a positive response, while in the uterotrophic test the numbers preceding the brackets refer to the multiple of the group mean uterus weight as compared to the uterus weight of the control animals.

As will be seen from the above table, the compound of the present invention is vastly superior to the compounds used in this art.

We claim:

1. A process of preparing estradiol 3-propargyl ether 17-trichloroacetate comprising treating estradiol with propargyl bromide and a first base selected from the group consisting of an alkali metal hydroxide, an alkali metal alkoxide and an alkali metal carbonate in the presence of dimethylsulfoxide to form estradiol 3-propargyl ether, and treating said last-mentioned compound with trichloroacetyl chloride in the presence of a second base consisting of a tertiary amine.

2. A process as defined in claim 1, wherein the step of treating said estradiol is carried out at a temperature of from about 18° C. to about 100° C.

3. A process as defined in claim 2, wherein the step of treating the estradiol is carried out for a period of time ranging from one minute to five hours.

4. A process as defined in claim 1, wherein said tertiary amine is selected from the group consisting of triethylamine and pyridine.

5. A process as defined in claim 1, wherein said first-mentioned base is an alkali metal carbonate.

6. A process as defined in claim 1, wherein said first-mentioned base is an alkali metal alkoxide.

7. A process as defined in claim 6, wherein said alkali metal alkoxide is sodium methoxide.

8. A process as defined in claim 5, wherein said alkali metal carbonate is potassium carbonate.

9. A process as defined in claim 4, wherein said tertiary amine is triethylamine.

10. A process as defined in claim 4, wherein said tertiary amine is pyridine.

11. Estradiol 3-propargyl ether 17-trichloroacetate.

References Cited

UNITED STATES PATENTS

| | | | |
|---|---|---|---|
| 3,077,486 | 2/1963 | Huffman | 260—397.5 |
| 3,231,567 | 1/1966 | Ercoli et al. | 260—239.55 |
| 3,275,623 | 9/1966 | Knox | 260—239.55 |
| 3,374,228 | 3/1968 | Fried | 260—239.55 |

HENRY A. FRENCH, Primary Examiner

U.S. Cl. X.R.

424—238